United States Patent
Paterson et al.

(10) Patent No.: US 8,423,285 B2
(45) Date of Patent: Apr. 16, 2013

(54) ENHANCED ADAPTIVE OPTIMIZATION AND PRESENTATION OF ON-LINE MAP DATA

(75) Inventors: Kevin G. Paterson, San Antonio, TX (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 12/398,511

(22) Filed: Mar. 5, 2009

(65) Prior Publication Data

US 2010/0228474 A1 Sep. 9, 2010

(51) Int. Cl.
*G01C 21/00* (2006.01)
(52) U.S. Cl.
USPC .............. 701/408; 701/400; 701/300
(58) Field of Classification Search ........... 250/369; 345/629; 348/239; 455/456.5; 701/200, 701/201, 207, 209; 715/769
See application file for complete search history.

(56) References Cited

U.S. PATENT DOCUMENTS

| | | | | |
|---|---|---|---|---|
| 2002/0008765 A1* | 1/2002 | Ejima et al. | | 348/239 |
| 2003/0182052 A1* | 9/2003 | DeLorme et al. | | 701/201 |
| 2004/0093155 A1* | 5/2004 | Simonds et al. | | 701/200 |
| 2008/0248815 A1* | 10/2008 | Busch | | 455/456.5 |
| 2009/0164929 A1* | 6/2009 | Chen et al. | | 715/769 |

* cited by examiner

*Primary Examiner* — Michelle Le
(74) *Attorney, Agent, or Firm* — Patterson & Sheridan LLP (57) ABSTRACT

Systems, methods and articles of manufacture are disclosed for presenting map data on a computing device. The map may be dynamically adapted based on a physical characteristic, such as display resolution, of the computing device. The map may be further adapted based on a user activity, such as shopping, that is taking place. Input from a user in response to a rendered map may be used to create a manual override or a learned override to further adapt the map for the computing device. The input may be from the user of the computing device or from users of other computing devices.

25 Claims, 7 Drawing Sheets

ENHANCED ADAPTIVE OPTIMIZATION AND PRESENTATION OF ON-LINE MAP DATA

BACKGROUND OF THE INVENTION

1. Field of the Invention

The field of the invention relates to navigation systems. More specifically, the field of the invention relates to adapting map data for display on a computing device.

2. Description of the Related Art

Navigation systems have become widely used within a variety of devices for acquiring directions and for assisting in travel planning. Such navigation systems typically rely in part on global positioning system (GPS) location and direction information to generate navigation information. Navigation information may typically include maps, directions, and points of interest (POIs). Further, navigation systems may provide the ability to view specific locations along a travel route, to select specific POIs, to adjust a zoom level for display, and so forth.

SUMMARY OF THE INVENTION

One embodiment of the invention includes a method for presenting map data on a computing device. The method may generally include providing data describing a location and movement of the computing device; determining a usage mode based on the data, wherein the usage mode is selected from a predefined plurality of usage modes each corresponding to a different type of user activity, and wherein each usage mode is associated with one or more display parameters; and rendering an image on the computing device according to the one or more display parameters associated with the selected usage mode, wherein the image includes map data and points of interest (POIs), whereby the image is adaptively rendered according to the data describing the location and movement of the computing device.

Another embodiment of the invention includes a computer-readable storage medium containing a program, which when executed by the processor is configured to perform an operation for presenting map data on a computing device. The operation should generally include providing data describing a location and movement of the computing device; determining a usage mode based on the data, wherein the usage mode is selected from a predefined plurality of usage modes each corresponding to a different type of user activity, and wherein each usage mode is associated with one or more display parameters; and rendering an image on the computing device according to the one or more display parameters associated with the selected usage mode, wherein the image includes map data and points of interest (POIs), whereby the image is adaptively rendered according to the data describing the location and movement of the computing device.

Still another embodiment of the invention includes a system having a processor and a memory containing a program, which when executed by the processor is configured to perform an operation for presenting map data on a computing device. The operation should generally include providing data describing a location and movement of the computing device; determining a usage mode based on the data, wherein the usage mode is selected from a predefined plurality of usage modes each corresponding to a different type of user activity, and wherein each usage mode is associated with one or more display parameters; and rendering an image on the computing device according to the one or more display parameters associated with the selected usage mode, wherein the image includes map data and points of interest (POIs), whereby the image is adaptively rendered according to the data describing the location and movement of the computing device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a method and apparatus for presenting maps on computing devices. Navigation systems may display maps on navigation devices or on computing devices. Navigation devices are devices designed specifically for presenting navigation information. The term "computing device" is used herein to refer to devices other than navigation devices, e.g., a cellular phone, a personal digital assistant (PDA), a laptop computer, a portable gaming device, a portable media player, and the like, i.e., any device other than a navigation device that includes a processor and storage media and that may be used to implement the embodiments described herein.

In many cases, a computing device may have lesser capabilities than a navigation device. For example, the display resolution of a cellular phone may be smaller than that of a navigation device. In other cases, a computing device may have broader capabilities than a navigation device. For example, the display resolution of a laptop computer may be greater than that of a navigation device. Accordingly, it is desirable in some cases to render the output in a manner particularly suited for the specific computing device.

To this end, one embodiment of the invention provides a map formatter. The map formatter adapts a map for display on a computing device, based on various criteria. One such criterion is the physical characteristics (such as display resolution) specific to the computing device. For example, on a cellular phone with a low display resolution, the map formatter may display a map at an increased zoom level and with fewer points of interest. On a laptop computer with a high display resolution, the map formatter may display a map at a decreased zoom level and with more points of interest.

According to one embodiment, the map formatter may also adapt a map based on a user activity that is taking place. For example, a user that is driving may wish to see street names as points of interest on a map that has a two-block radius. In contrast, a user that is walking may wish to see building names as the points of interest on a map that has a one-block radius. Further, a user that is shopping at a store may wish to see product inventory (e.g., women's apparel, men's apparel, etc.) as the points of interest on a map that has a quarter-block radius.

According to one embodiment, the map formatter may also adapt a map based on user overrides. The user overrides may be manual overrides or learned overrides. For example, a user that is driving may wish to see a map that has a three-block radius rather than a two-block radius. The user may specify a three-block radius as a manual override. Alternatively, if the map formatter detects that the user frequently decreases the zoom level to a three-block radius whenever a map is rendered, the map formatter may create a learned override for the user so that the map formatter subsequently defaults to a three-block radius zoom level. Both manual overrides and learned overrides may be stored in one or more user profiles.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
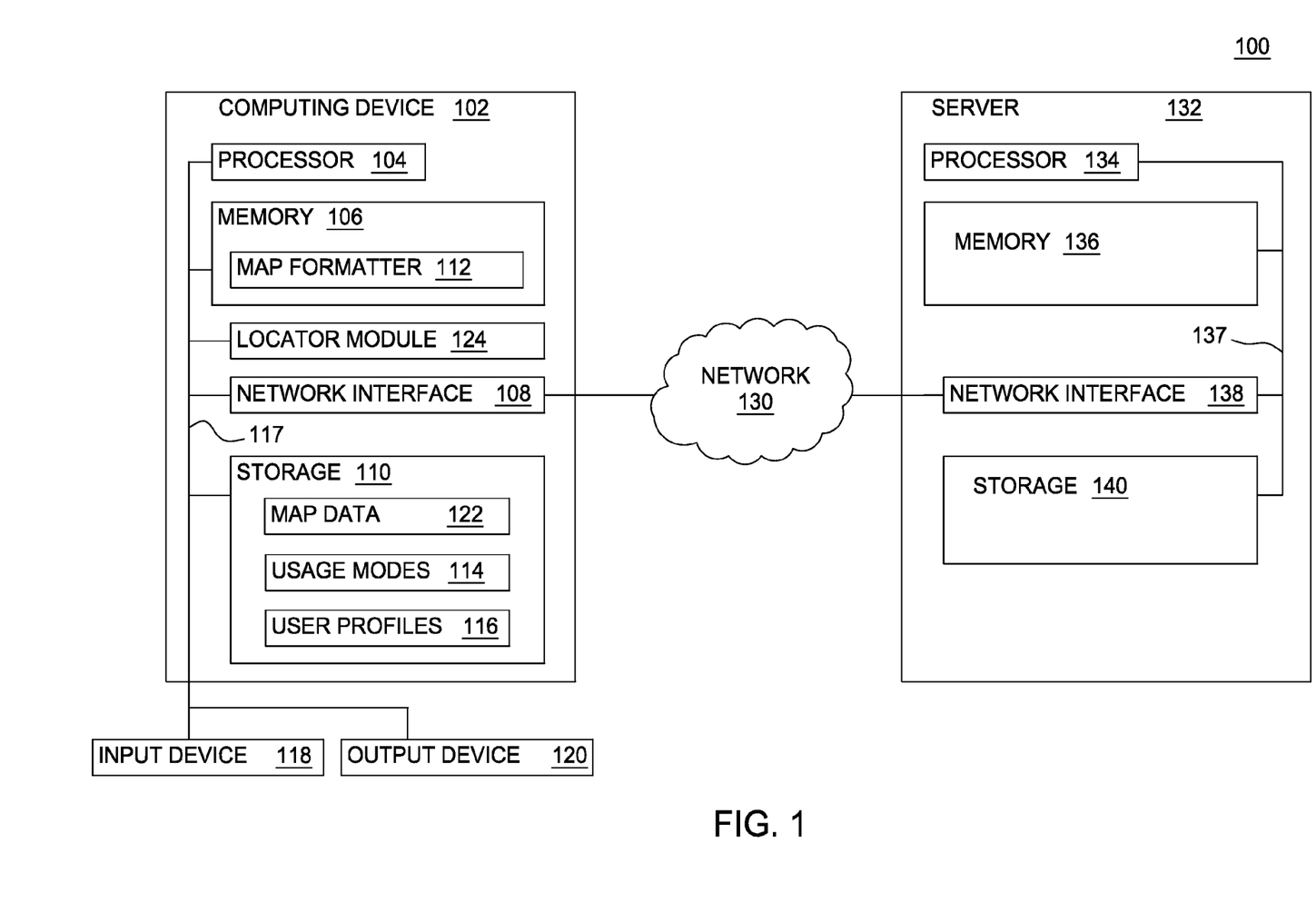
FIG. 1 is a block diagram illustrating a system for adapting map data, according to one embodiment of the invention.

FIG. 1 is a block diagram illustrating a system 100 for formatting map data, according to one embodiment of the invention. In general, the networked system 100 includes a computing device 102 and a server 132. The computing device 102 and the server 132 are connected via a network 130. In general, the network 130 may be a telecommunications network and/or a wide area network (WAN). In a particular embodiment, the network 130 is the Internet.

The computing device 102 includes a processor 104 connected via a bus 117 to a memory 106, a network interface device 108, a storage 110, a locator module 124, an input device 118, and an output device 120. The processor 104 could be any hardware processor used to perform an embodiment of the invention.

The computing device 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 is preferably a random access memory sufficiently large to hold the necessary programming and data structures of the invention. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a map formatter 112 that, when executed on processor 104, formats map data 122 for output via the output device 120. FIGS. 2 through 7 and associated descriptions detail the structure and operation of the map formatter 112.

Although embodiments are described herein with reference to a map formatter 112 that resides in the memory 106 of the computing device 102, those skilled in the art will recognize that embodiments of the invention may be adapted for use with a map formatter 112 that wholly or partially resides elsewhere, such as on a server 132, or both on a computing device 102 and on a server 132.

The network interface device 108 may be any entry/exit device configured to allow network communications between the computing device 102 and the server 132 via the network 130. For example, the network interface device 108 may be a network adapter or other network interface card (NIC).

As shown, the locator module 124 may be any receiver that performs navigation functions. In one embodiment the locator module 124 is a GPS receiver. The computing device 102 may have an internal system (such as an internal GPS module) for receiving location data or may be connectable to an external receiver (such as a standalone GPS receiver) for receiving location data. That is, although embodiments are described herein with reference to a computing device 102 with a internal locator module 124, those skilled in the art will recognize that embodiments of the invention may be adapted for other configurations in which the locator module 124 is an external receiver that communicates with the computing device 102 via Universal Serial Bus (USB), Wi-Fi, Bluetooth, LAN, etc.

Although embodiments are described herein with reference to GPS, other navigation systems such as GLONASS, Galileo, and Global Navigation Satellite System (GNSS) may be supported by embodiments of the invention and are broadly contemplated. The locator module 124 may also detect movement and location of the computing device 102 through other means, such as accelerometers and cell tower triangulation.

The storage 110 may be a Direct Access Storage Device (DASD). Although the storage 110 is shown as a single unit, the storage 110 may be a combination of fixed and/or removable storage devices, such as fixed disc drives, floppy disc drives, tape drives, removable memory cards, or optical storage. The memory 106 and the storage 110 may be part of one virtual address space spanning multiple primary and secondary storage devices.

As shown, the storage 110 includes map data 122, usage modes 114 and user profiles 116. The map formatter 112 processes the map data 122 for output to the output device 120. Further, the map formatter 122 adapts a map based on a user activity by selecting from a predefined set of usage modes 114. Each usage mode 114 may specify a type of activity of the user (such as "walking") and associated display parameters (such as zoom level and the number and type of POIs to display). The map formatter 112 may also adapt a map based on user overrides stored in user profiles 116.

Although embodiments are described herein with reference to map data 122, usage modes 114, and user profiles 116 that are stored on the computing device 102, those skilled in the art will recognize that embodiments of the invention may be adapted for map data 122, usage modes 114, and user profiles 116 that are stored elsewhere. For example, the map data 122 may be stored in the storage 140 of the server 132. That is, in some embodiments, the server 132 may stream the map data 122 to the computing device 102 for processing by the map formatter 112. The usage modes 114 and user profiles 116 may similarly reside on the server 132. Furthermore, network models other than client-server, such as peer-to-peer, are broadly contemplated.

The input device 118 may be any device for providing input to the computing device 102. For example, a keyboard, keypad, light pen, touch-screen, track-ball, or speech recognition unit, audio/video player, and the like may be used.

The output device 120 may be any device for providing output to a user of the computing device 102. For example, the output device 120 may be any conventional display screen or set of speakers, along with their respective interface cards, i.e., video cards and sound cards (not shown). Although shown separately from the input device 118, the output device 120 and input device 118 may be combined. For example, a display screen with an integrated touch-screen, a display with an integrated keyboard, or a speech recognition unit combined with a text speech converter may be used.

The server 132 generally includes a processor 134, a memory 136, a network interface device 138, and a storage device 140, coupled to one another by a bus 137. The memory 136 may be a random access memory sufficiently large to hold the necessary programming and data structures that are located on the communications server 132. The programming and data structures may be accessed and executed by the processor 134 as needed during operation.

The storage 140 may be a Direct Access Storage Device (DASD). Although the storage 140 is shown as a single unit, the storage 140 may be a combination of fixed and/or removable storage devices, such as fixed disc drives, floppy disc drives, tape drives, removable memory cards, or optical storage. The memory 136 and the storage 140 may be part of one virtual address space spanning multiple primary and secondary storage devices.

Figure 2:
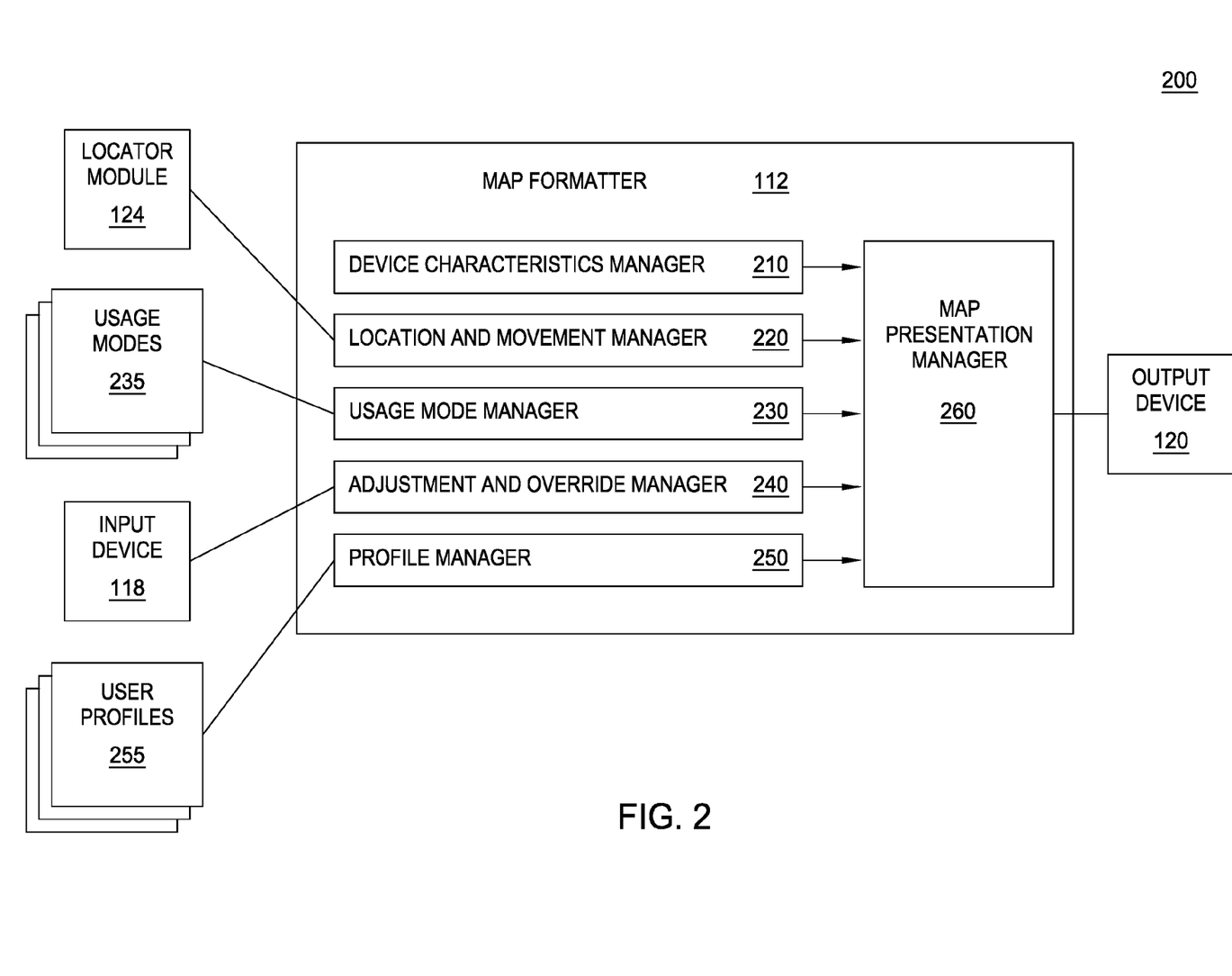
FIG. 2 is a block diagram illustrating a functional view of a map formatter, according to one embodiment of the invention.

FIG. 2 is a block diagram illustrating a functional view 200 of the map formatter 112 of FIG. 1, according to one embodiment of the invention. As shown, the map formatter 112 includes a device characteristics manager 210, a location and movement manager 220, a usage mode manager 230, an adjustment and override manager 240, a profile manager 250, and a map presentation manager 260.

In one embodiment, the map presentation manager 260 receives formatting commands from the device characteristics manager 210, the location and movement manager 220, the usage mode manager 230, the adjustment and override manager 240, and the profile manager 250. Formatting commands are commands for changing a display parameter (such as zoom level) for a map. After processing all of the formatting commands and adjusting display parameters accordingly, the map presentation manager 260 renders a map for display via the output device 120.

The device characteristics manager 210 may detect the physical characteristics (such as display resolution) of the computing device 102 and send formatting commands to the map presentation manager 260, according to one embodiment. The formatting commands sent may differ based on the detected physical characteristics of the computing device 102. Illustrative device characteristics are shown in Table I:

TABLE I

Device characteristics example

| Display resolution | Zoom level | Points of interest (POI) |
|---|---|---|
| Low (320 × 240) | Zoom in to 3× | Display 5 POI per pane |
| High (1024 × 768) | Zoom out to 1× | Display 15 POI per pane |

In the above example, if the device characteristics manager 210 detects a low display resolution of 320×240, the device characteristics manager 210 may instruct the map presentation manager 260 to display a smaller number (i.e., 5) of POIs on a map. If the device characteristics manager 210 detects a high display resolution of 1024×768, the device characteristics manager 210 may instruct the map presentation manager 260 to display a greater number (i.e., 15) of POIs on the map. Furthermore, the device characteristics manager 210 may instruct the map presentation manager 260 to set a higher zoom level of 3× for the low display resolution, and a lower zoom level of 1× for the high display resolution.

In one embodiment, the device characteristics manager 210 may use a lookup function to retrieve a physical characteristic of the computing device 102. The lookup function may retrieve data (such as device model and display resolution) that is stored on the computing device 102 itself. Alternatively, the lookup function may retrieve data from a proprietary database for storing device characteristics. The lookup function may also retrieve data from publicly available data sources, such as vendor websites. Other ways of retrieving physical characteristics are broadly contemplated.

The location and movement manager 220 receives input from the locator module 124 and sends formatting commands to the map presentation manager 260, according to one embodiment. The formatting commands sent may differ based on detected location and movement of the computing device 102. For example, if the detected location and movement suggests that the user is driving and has just entered a freeway, the location and movement manager 220 may send a command for decreasing the zoom level of a map.

Although embodiments are described herein with reference to location and movement information being sent by the locator module 124 to the location and movement manager 220, those skilled in the art will recognize that embodiments of the invention may be adapted for location and movement being wholly or partly calculated by the location and movement manager 220, based on data received from locator module 124. For example, in one embodiment, the location and movement manager may compute the traveling speed of the computing device 102 based on a set of location data received from the locator module 124.

The usage mode manager 230 receives location and movement information from the location and movement manager 220 and selects a usage mode from a predefined set of usage modes 235 based on the received location and movement information, according to one embodiment. Each usage mode 235 defines a user activity (such as "walking") and specifies one or more associated display parameters (such as zoom level and type of POIs to display). Illustrative usage modes are shown in Table II:

TABLE II

Usage Modes example

| Usage mode | Zoom level | Points of interest (POIs) |
|---|---|---|
| Walking | 1-block radius | Building names |
| Shopping | Store layout | Product inventory |
| Driving | 2-block radius | Street names |

Each of the usage modes may be characterized by predefined criteria. Such criteria include, for example, speed, location, direction, acceleration, etc. For example, a walking usage mode may correspond to the computing device 102 moving at a speed greater than zero and less than 5 miles per hours on a path designated for walking (e.g., a sidewalk). Thus, if the computing device 102 is traveling at a speed and along a route indicative that a user of the computing device 102 is walking, the usage mode manager 230 may select a usage mode for "walking". Once the usage mode for "walking" is selected, the display parameters associated with the usage mode are used to instruct the map presentation manager 260 to adjust a map display accordingly. For example, the usage mode manager 230 may send a command instructing the map presentation manager 260 to display a map at a "one-block radius" zoom level and with "building names" as the POIs.

Similarly, if the computing device 102 is at a location indicative that the user is shopping (e.g., the user is located inside a store), the usage mode manager 230 may select a usage mode for "shopping." Once the usage mode is selected, the usage mode manager 230 may send a command instructing the map presentation manager 260 to display the map at a "store-layout" zoom level and with product inventory (such as women's apparel) as the POIs.

Further, if the computing device 102 is traveling at a speed (e.g., greater than 20 miles per hour) and along a route indicative that the user is driving (e.g., a highway), the usage mode manager 230 may select a usage mode for "driving." In another embodiment, the computing device 102 may communicate with an onboard vehicular system of a vehicle being operated by the user. The onboard system may signal the computing device 102 to enter the driving usage mode once the ignition system of the vehicle is powered. In the example, once the usage mode is selected, the usage mode manager 230 may send a command instructing the map presentation manager 260 to display the map at a "two-block radius" zoom level and with street names as the POIs. In one embodiment, the map formatter 112 detects a change in usage mode (for example, a change from Walking to Shopping) and formats a map accordingly. Other usage modes may be supported by embodiments of the invention and are broadly contemplated.

The adjustment and override manager 240 receives user input via the input device 118 and creates user overrides based on the received user input. The user overrides may be manual overrides or learned overrides. If the user specifies an override for a display parameter (zoom level of 3× instead of 2×, for example), the adjustment and override manager 240 may create a manual override. Alternatively, if the user makes a certain number of adjustments to a display parameter, the number exceeding a predefined threshold, the adjustment and override manager 240 may create a learned override. Illustrative thresholds are shown in Table III:

TABLE III

Learning system example

| Override Type | Threshold to be exceeded |
|---|---|
| Zoom | 5 adjustments |
| POI exclusion | 3 exclusions |

In the above example, if the user makes more than five identical zoom adjustments to a displayed map, the adjustment and override manager 240 may create a learned override for the zoom adjustment. Similarly, if the user more than thrice excludes a specific POI (such as Hotel X) or type of POI (such as hotels) from being displayed, the adjustment and override manager 240 may create a learned override for the POI exclusion. The adjustment and override manager 240 stores manual overrides and learned overrides via the profile manager 250.

In one embodiment, the adjustment and override manager 240 may receive overrides from another user or group of users. For example, a map formatter 112 executing on the server 132 may receive information about adjustments made by users and/or overrides (learned or manual) created by other users. In some situations, identical adjustments or overrides may be created by a number of users. For example, six thousand users may adjust a zoom level from 2× to 3× for the Shopping usage mode. If a predefined threshold is exceeded (e.g., five thousand users, thirty percent of users, twenty thousand adjustments, etc.), the map formatter 112 executing on the server 132 may designate the override (or adjustment) as a "community override".

The community override may be sent from the server 132 to the computing device 102 and be recommended to the user of the computing device 102. Further, a community override may include statistical computation (e.g., mean, median, or mode) of user adjustments and/or user overrides. For example, two thousand users may adjust a zoom level to an average of 1.5× for the Walking usage mode. In one embodiment, adjustments made and/or overrides created by the user of the computing device 102 may also be sent to the server 132 for the purpose of determining community overrides.

The profile manager 250 stores information (such as device characteristics and user overrides) into user profiles 255. The profile manager 250 receives user overrides from the adjustment and override manager 240. The user overrides may be manual overrides or learned overrides, and are stored in a user profile. An illustrative user profile that includes overrides is shown in Table IV:

TABLE IV

User profile example

| Override Type | Override |
| --- | --- |
| Manual | Exclude all hotel chains except Hotel X |
| Manual | Exclude women's apparel from product inventory |
| Learned | Zoom level of a 2-block radius for usage mode "Walking" |

In the above example, the user profile specifies a manual user override of excluding all hotel chains except Hotel X from a map. Further, the user profile specifies a manual user override of excluding women's apparel from a map with product inventory as the POIs. Moreover, the user profile specifies a learned override of a zoom level of a two-block radius for the usage mode of "walking." The profile manager 250 sends commands to the map presentation manager 260 to adjust a map appropriately, based on the overrides stored in the user profiles 255.

Figure 3:
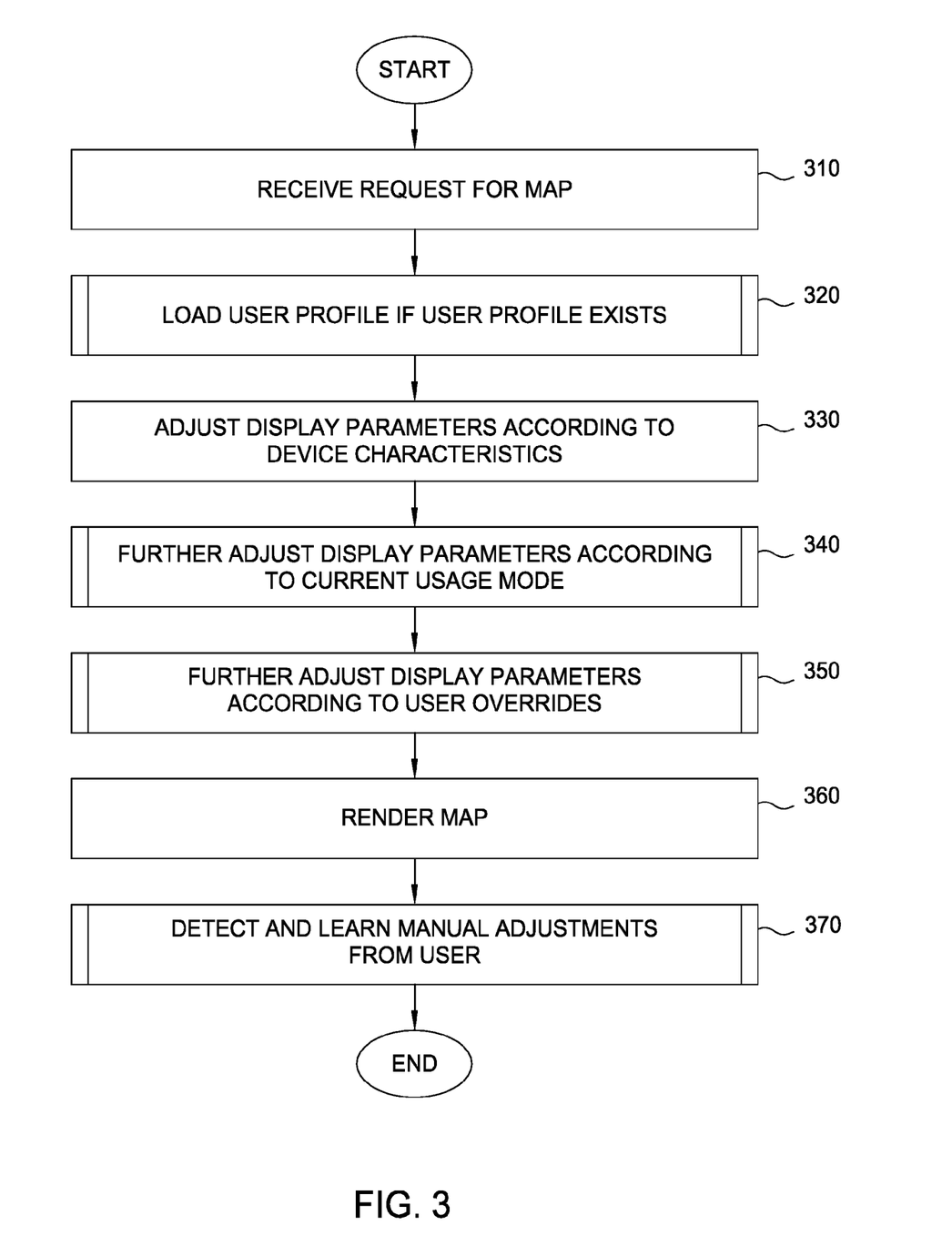
FIG. 3 is a flowchart depicting a method for presenting a map on a computing device, according to one embodiment of the invention.

FIG. 3 is a flowchart depicting a method 300 for presenting a map on a computing device, according to one embodiment of the invention. In one embodiment, the method 300 is performed by the map formatter 112 of FIG. 1. As shown, the method 300 begins at step 310, where the map formatter 112 receives a request for a map. For example, a user of the computing device 102 may issue a request for a map via the input device 118. At step 320, the map formatter 112 loads a user profile if a user profile exists. For example, if a user profile is found (such as a user profile shown in Table IV), the map formatter 112 loads the user profile into memory 106.

At step 330, the map formatter 112 adjusts display parameters of a map according to physical characteristics of the computing device 102. For example, the map formatter 112 may lower the number of displayed POIs for a low display resolution of 320×240. At step 340, the map formatter 112 further adjusts the display parameters according to a current usage mode. For example, if the current usage mode is determined to be "shopping," the map formatter may adjust the POIs to be product inventory instead of street names.

At step 350, the map formatter 112 adjusts the display parameters further still, according to user overrides. For example, if a current user profile contains a user override to exclude women's apparel from product inventory, the map formatter may accordingly exclude women's apparel from being displayed as a POI. At step 360, the map formatter 112 renders a map for display via the output device 120. At step 370, the map formatter 112 detects and learns any manual adjustments made by the user in response to the rendered map. For example, if the user frequently increases the zoom level in response to a displayed map, the map formatter "learns" the adjustment by storing the adjustment into a user profile if the frequency of adjustments exceeds a predefined threshold (such as shown in Table III above). After step 370, the method 300 terminates.

Figure 4:
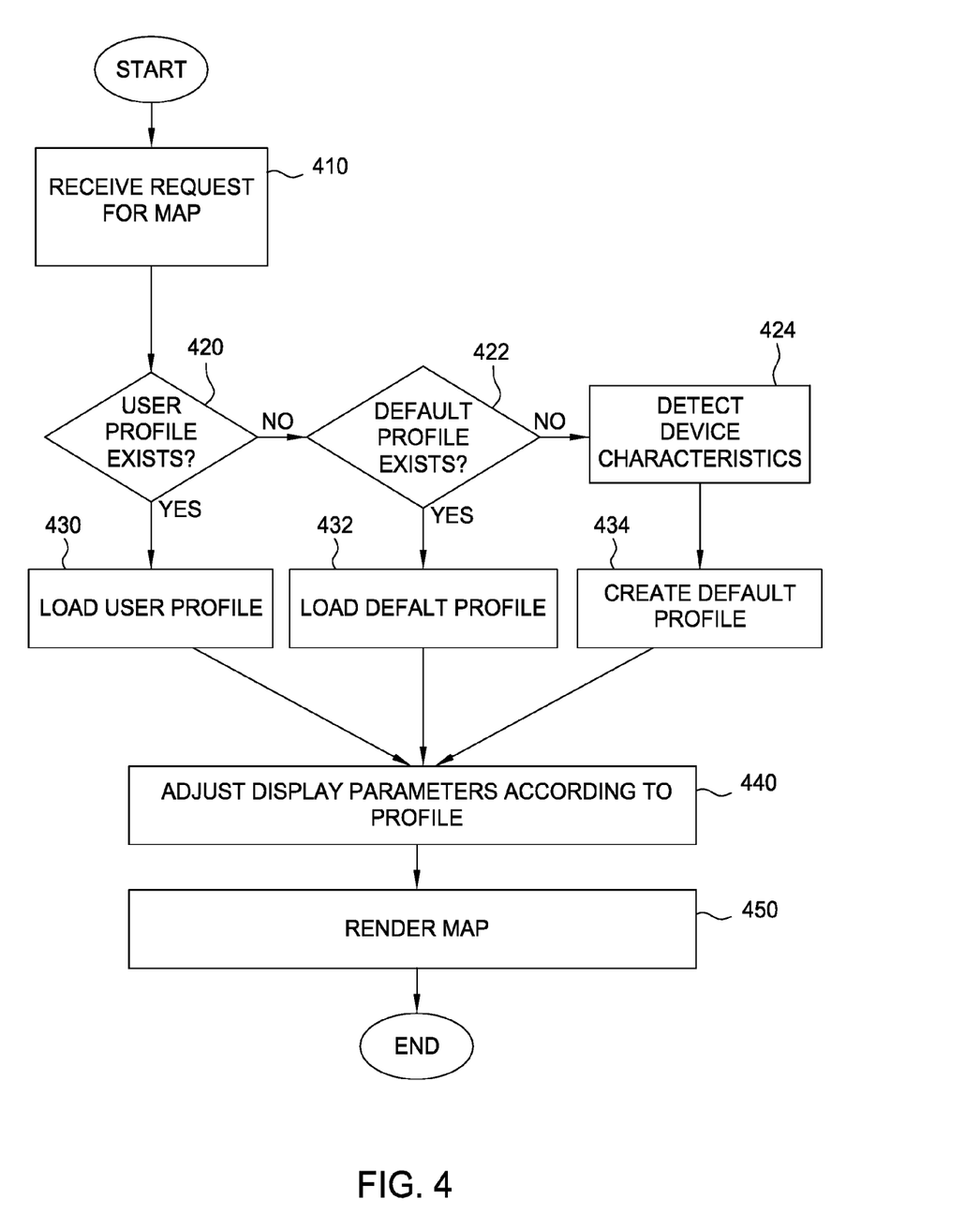
FIG. 4 is a flowchart depicting a method for adjusting display parameters based on a user profile, according to one embodiment of the invention.

FIG. 4 is a flowchart depicting a method 400 for adjusting display parameters based on a user profile, according to one embodiment of the invention. The steps of method 400 correspond to steps 310 through 330 of FIG. 3 and are described in conjunction with the device characteristics of Table I.

As shown, the method 400 begins at step 410, where the map formatter 112 receives a request for a map. For example, a user of the computing device 102 may issue a request for a map via input device 118.

At step 420, the profile manager 250 checks whether a user profile exists. If so, the method 400 proceeds to step 430, where the profile manager 250 loads the user profile into the memory 106. Otherwise, the method 400 proceeds to step 422, where the profile manager 250 checks whether a default profile exists. In one embodiment, a default profile is a profile that does not contain user overrides, but merely device characteristics (or associated display parameter adjustments).

If the default profile exists, the method 400 proceeds to step 432, where profile manager 250 loads the default profile into the memory 106. Otherwise, the method 400 proceeds to step 424, where the device characteristics manager 210 detects the physical characteristics (such as display resolution) of the computing device 102. At step 434, the profile manager 250 creates a default profile from the detected physical characteristics. Continuing the example given in Table I, the default profile may include a zoom level for a 320×240 display.

After step 430, step 432, or step 434, the method 400 proceeds to step 440, where the profile manager 250 adjusts one or more display parameters according to the user profile (or default profile). Continuing the example shown in Table I, the profile manager 250 may increase the zoom level to 3x for a display resolution of 320×240. In one embodiment, the one or more display parameters may be adjusted via commands to the map presentation manager 260.

At step 450, the profile manager 250 sends a command to map presentation manager 260 to render a map according to the adjusted display parameters. After step 450, method 400 terminates.

Figure 5:
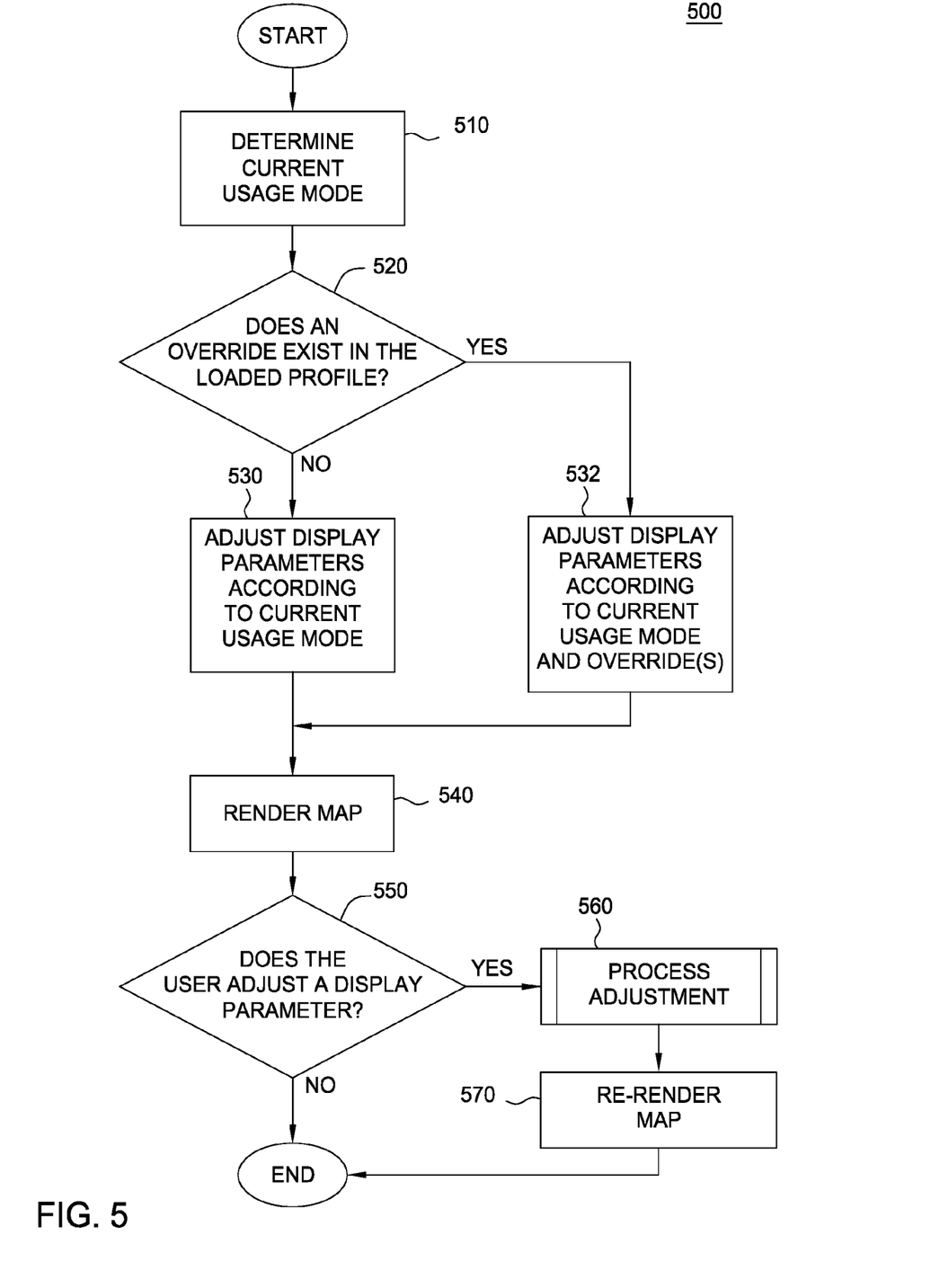
FIG. 5 is a flowchart depicting a method for adjusting display parameters based on a current usage mode, according to one embodiment of the invention.

FIG. 5 is a flowchart depicting a method 500 for adjusting display parameters based on a current usage mode, according to one embodiment of the invention. The steps of method 500 correspond to steps 340 through 350 of FIG. 3 and are described in conjunction with the usage modes of Table II.

As shown, the method 500 begins at step 510, where the usage mode manager 230 determines a current usage mode. The usage mode manager 230 determines a current usage mode by receiving location and movement information from the location and movement manager 220 and selecting a usage mode from a predefined set of usage modes 235 based on the location and movement information, according to one embodiment. Each usage mode defines a user activity (such as "walking") and specifies one or more associated display parameters (such as zoom level and type of POIs to display). Referring to Table II, if the computing device 102 is at a location indicative that the user is shopping (e.g., the user is located inside a store), the usage mode manager 230 may select a usage mode for "shopping."

Once the current usage mode is determined, at step 520, the profile manager 250 determines whether a user override exists in the user profile that is currently active (i.e., the user profile that is loaded into the memory 106). If not, the method 500 proceeds to step 530, where the usage mode manager 230 adjusts display parameters according to the current usage mode. For example, referring again to Table II, if the current usage mode is "shopping," the usage mode manager 230 may adjust the POIs to be product inventory instead of street names.

If, however, a user override is found, the method 500 proceeds to step 532, where the usage mode manager 230 adjusts display parameters according to the current usage mode and the user override. For example, if a user override of "exclude women's apparel" is found in the user profile, the usage mode manager 230 may remove women's apparel from being displayed as a POI.

After step 530 or step 532, the method 500 proceeds to step 540, where the map presentation manager renders a map for display via the output device 120. At step 550, the adjustment and override manager 240 detects whether the user adjusts a display parameter in response to the rendered map. For example, the user may input a "zoom in" command via the input device 118. If so, at step 560, the adjustment and override manager 240 processes the adjustment. Processing the adjustment includes making the adjustment (e.g., by increasing the zoom level) and learning the adjustment (storing a specific adjustment into a user profile if a threshold number of the same adjustments have been made), according to one embodiment.

After step 560, the method 500 proceeds to step 570, where the map presentation manager 260 re-renders the map based on the adjustment. After step 550 or step 570, the method 500 terminates.

Figure 6:
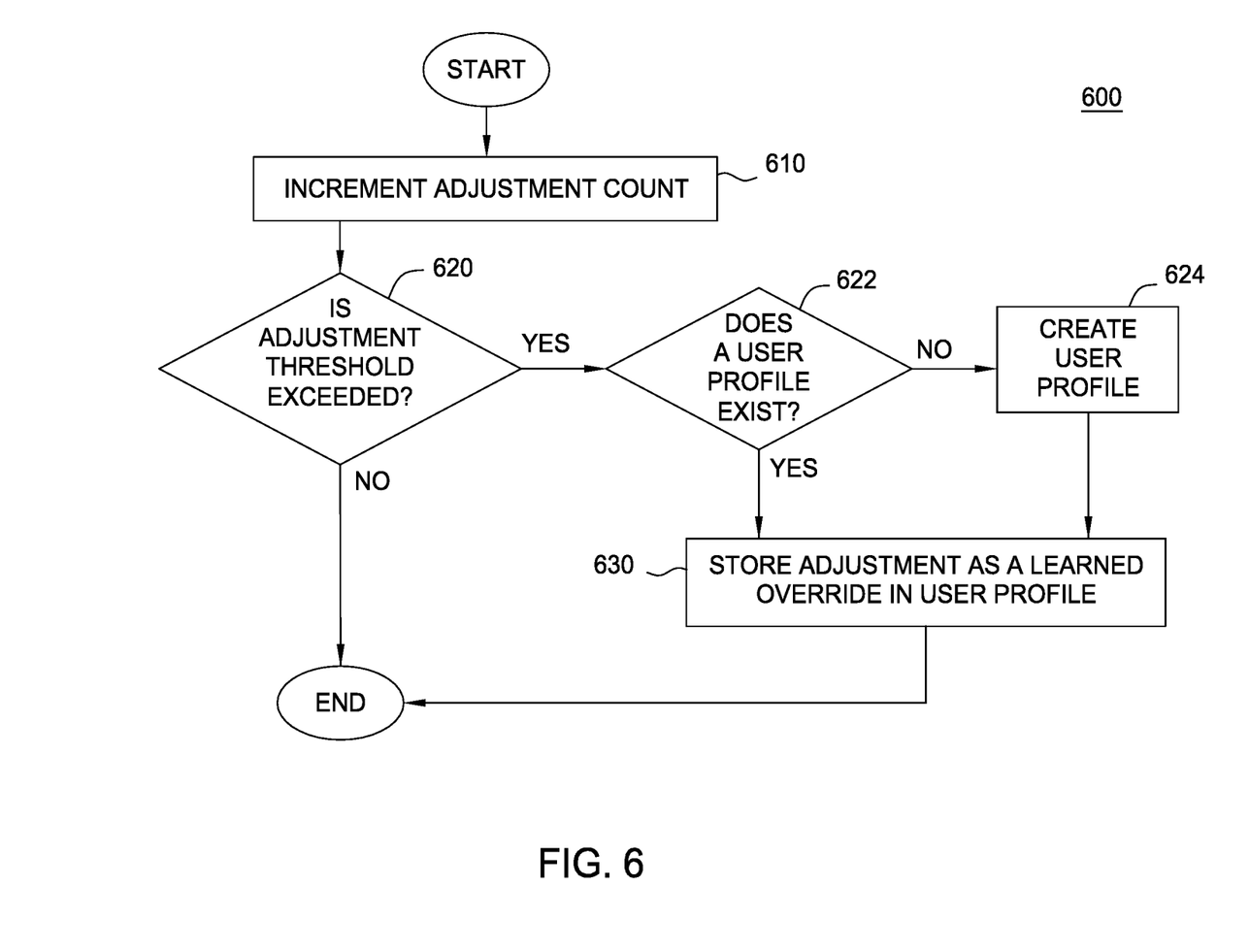
FIG. 6 is a flowchart depicting a method for processing an adjustment, according to one embodiment of the invention.

FIG. 6 is a flowchart depicting a method 600 for processing an adjustment, according to one embodiment of the invention. The steps of method 600 correspond to step 370 from FIG. 3 and to step 560 from FIG. 5. Further, the steps of method 600 are described in conjunction with the thresholds of Table III and with the user profile of Table IV.

As shown, the method 600 begins at step 610, where the adjustment and override manager 240 increments an adjustment count for the adjustment. In one embodiment, an adjustment count is stored in the user profile and maintained for each specific adjustment made by the user. For example, "increase zoom level to 4× for the usage mode of 'walking'" may have a counter value of 3, representing that the user thrice increased the zoom level to 4× in response to viewing a map rendered with display parameters associated with a "walking" usage mode.

At step 620, the adjustment and override manager 240 determines whether an adjustment threshold is exceeded. Continuing the example shown in Table III, if the user makes more than five identical zoom adjustments to a displayed map, the adjustment and override manager 240 may create a learned override for the zoom adjustment. Because the user has only thrice made a zoom adjustment, the threshold is not exceeded, and a learned override is not created.

If an adjustment threshold is exceeded, however, the corresponding adjustment may be stored as a learned override in a user profile, according to one embodiment. Unlike a user profile, a default profile only contains information about device characteristics (or associated display parameters) and does not contain overrides. Therefore, if the active profile is a default profile, a user profile may be created in which to store the learned override, according to one embodiment.

Accordingly, if an adjustment threshold is exceeded, the method 600 proceeds to step 622, where the profile manager 250 determines whether a user profile exists. If a user profile is not found, the method 600 proceeds to step 624, where the profile manager 250 creates a user profile. After step 622 or step 624, method 600 proceeds to step 630, where the adjustment and override manager 240 instructs the profile manager 250 to store the adjustment as a learned override in the user profile (such as a learned override shown in Table IV). After step 620 or step 630, method 600 terminates.

Figure 7:
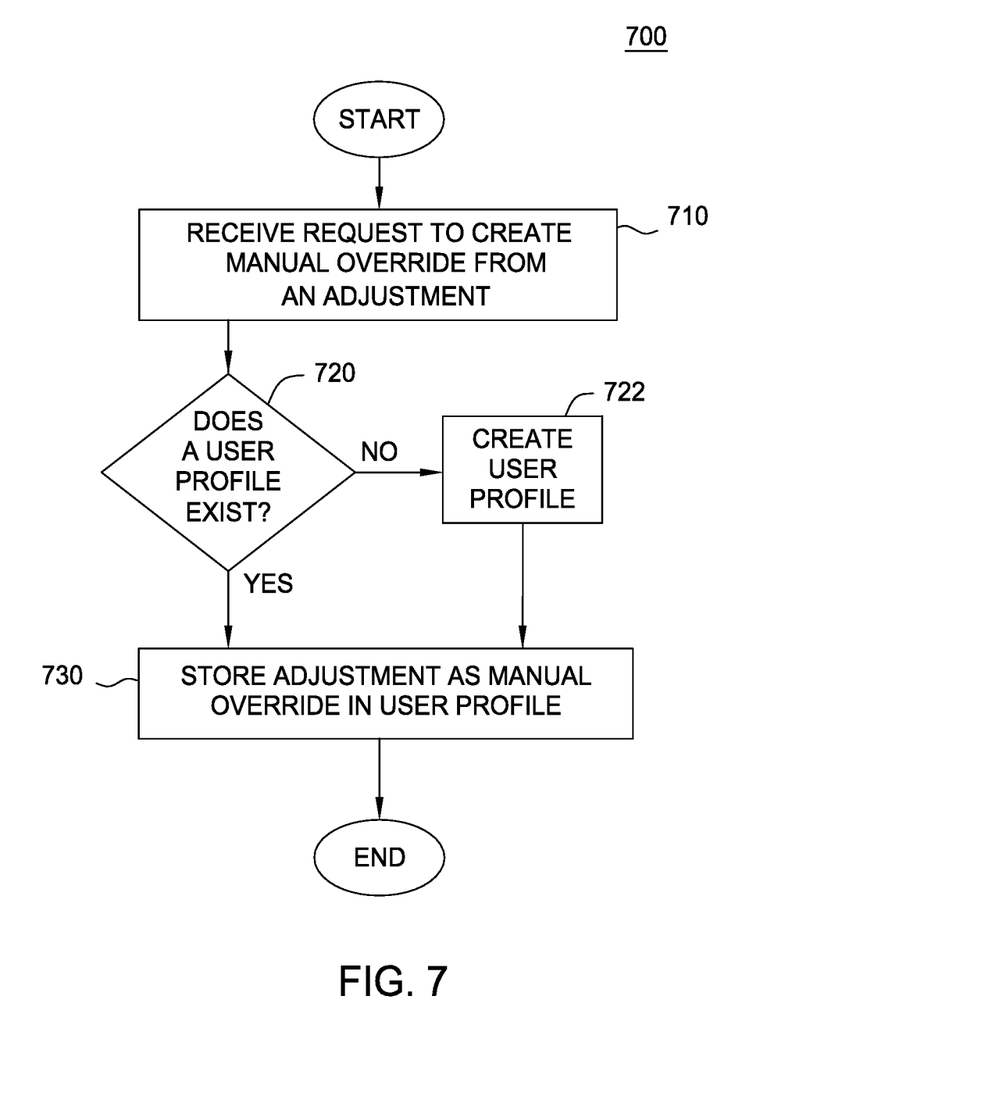
FIG. 7 is a flowchart depicting a method for processing a manual override, according to one embodiment of the invention.

FIG. 7 is a flowchart depicting a method 700 for processing a manual override, according to one embodiment of the invention. The steps of method 700 correspond to step 370 from FIG. 3 and to step 560 from FIG. 5. Further, the steps of method 700 are described in conjunction with the thresholds of Table III and with the user profile of Table IV.

As shown, the method 700 begins at step 710, where the adjustment and override manager receives a user request to create a manual override from an adjustment. For example, the user may wish to specify the adjustment of "increase zoom level to 4× for the usage mode of 'walking'" as a manual override. If a manual override is created, the manual override serves an identical effect as a learned override, without the user having to exceed a learning threshold (such as the learning thresholds shown in Table III).

At step 720, the profile manager determines whether a user profile exists. If a user profile is not found, the method 700 proceeds to step 722, where the profile manager 250 creates a user profile. After step 720 or step 722, method 700 proceeds to step 730, where the adjustment and override manager 240 instructs the profile manager 250 to store the adjustment as a manual override in the user profile (such as the manual override shown in Table IV). After step 720 or step 730, method 700 terminates.

Of course, the embodiments described herein are intended to be illustrative and not limiting of the invention, and other embodiments are broadly contemplated. Those skilled in the art will recognize, for example, that embodiments of the invention may be adapted to support other display parameters, such as map centering, map panning, map highlighting, and so forth. Similarly, device characteristics other than display resolution, for example, display type, physical display size, audio capabilities, display color capabilities, user input controls, and the like, may be supported. An example with regard to display color capabilities is given, as follows. In an embodiment in which the server 132 streams the map data 122 to the computing device 102 for processing by the map formatter 112, the server 132 may conserve bandwidth by omitting color information from being streamed to the computing device 102 if the computing device 102 has a black-and-white display. Further, a usage mode may be determined using other input, such as accelerometers, microphones, keypads, and the like. Further still, other usage modes, such as riding on a bus, riding on a train, riding on a plane, biking, and running, may be supported by embodiments of the invention.

Advantageously, embodiments of the invention dynamically adapt a map for display on a computing device. For example, the map may be adapted based on a physical characteristic (such as display resolution) specific to the computing device. In addition, the map may be further adapted based on a user activity (such as "walking") that is taking place. Moreover, the map may be even further adapted based on a manual override or a learned override. Further still, adjustments and overrides from users of other computing devices may be used to adapt a map for the computing device.

While the foregoing is directed to embodiments of the present invention, other and further embodiments of the invention may be devised without departing from the basic scope thereof, and the scope thereof is determined by the claims that follow.

What is claimed is:

1. A computer-implemented method for presenting map data on a computing device, the method comprising configuring one or more processors to perform an operation comprising:

providing data describing a location and movement of the computing device;

determining a usage mode based on the data, wherein the usage mode is selected from a predefined plurality of usage modes each corresponding to a different type of user activity, and wherein each usage mode is associated with one or more display parameters;

rendering an image on the computing device according to the one or more display parameters associated with the selected usage mode, wherein the image includes map data and points of interest (POIs), and whereby the image is adaptively rendered according to the data describing the location and movement of the computing device; and defining a learned override specifying a learned adjustment and a threshold for the learned adjustment, wherein the learned adjustment specifies a display parameter of the one or more display parameters and an adjustment value.

2. The computer-implemented method of claim 1, further comprising:

adjusting at least one of the one or more display parameters based on the data describing the location and movement of the computing device.

3. The computer-implemented method of claim 1, whereby the image is further adaptively rendered according to at least one physical characteristic of the computing device, the at least one physical characteristic including display resolution.

4. The computer-implemented method of claim 1, wherein the one or more display parameters include at least a zoom level and a POI setting, wherein the POI setting includes a number of POIs to display and a type of POI to display, and wherein the usage mode is selected from at least:

(i) a walking mode, if the computing device is moving at a speed and along a path indicative that a user of the computing device is walking;

(ii) a shopping mode, if the computing device is at a location corresponding to a shopping environment; and (iii) a driving mode, if the computing device is moving at a speed and along a path indicative that the user is driving.

5. The computer-implemented method of claim 3, further comprising:

adjusting at least one of the one or more display parameters based on the at least one physical characteristic of the computing device.

6. The computer-implemented method of claim 4, wherein the zoom level is decreased and the number of POIs to display is increased in proportion to a size of the display resolution.

7. The computer-implemented method of claim 1, further comprising:

receiving a manual override request specifying a manual adjustment, wherein the manual adjustment specifies a display parameter of the one or more display parameters and an adjustment value;

adjusting the display parameter based on the manual adjustment; and storing the manual adjustment in a user profile.

8. The computer-implemented method of claim 1, further comprising:

receiving a user adjustment that exceeds the specified threshold for the learned adjustment;

adjusting the display parameter based on the learned adjustment; and storing the learned adjustment in a user profile.

9. The computer-implemented method of claim 1, further comprising:

receiving overrides from one or more computing devices, wherein each override specifies an adjustment, and wherein the adjustment specifies a display parameter of the one or more display parameters and an adjustment value;

defining a community threshold for the overrides; and upon determining that the overrides exceed the community threshold:

determining a community adjustment based on the overrides;

adjusting the display parameter based on the community adjustment; and storing the community adjustment in a user profile.

10. A computer readable storage medium containing a program which, when executed, performs an operation for presenting map data on a computing device, the operation comprising:

providing data describing a location and movement of the computing device;

determining a usage mode based on the data, wherein the usage mode is selected from a predefined plurality of usage modes each corresponding to a different type of user activity, and wherein each usage mode is associated with one or more display parameters;

rendering an image on the computing device according to the one or more display parameters associated with the selected usage mode, wherein the image includes map data and points of interest (POIs), and whereby the image is adaptively rendered according to the data describing the location and movement of the computing device; and defining a learned override specifying a learned adjustment and a threshold for the learned adjustment, wherein the learned adjustment specifies a display parameter of the one or more display parameters and an adjustment value.

11. The computer readable storage medium of claim 10, wherein the operation further comprises:

adjusting at least one of the one or more display parameters based on the data describing the location and movement of the computing device.

12. The computer readable storage medium of claim 10, whereby the image is further adaptively rendered according to at least one physical characteristic of the computing device, the at least one physical characteristic including display resolution.

13. The computer readable storage medium of claim 10, wherein the one or more display parameters include at least a zoom level and a POI setting, wherein the POI setting includes a number of POIs to display and a type of POI to display, and wherein the usage mode is selected from at least:

(i) a walking mode, if the computing device is moving at a speed and along a path indicative that a user of the computing device is walking;

(ii) a shopping mode, if the computing device is at a location corresponding to a shopping environment; and (iii) a driving mode, if the computing device is moving at a speed and along a path indicative that the user is driving.

14. The computer readable storage medium of claim 12, wherein the operation further comprises:

adjusting at least one of the one or more display parameters based on the at least one physical characteristic of the computing device.

15. The computer readable storage medium of claim 10, wherein the operation further comprises:

receiving a manual override request specifying a manual adjustment, wherein the manual adjustment specifies a display parameter of the one or more display parameters and an adjustment value;

adjusting the display parameter based on the manual adjustment; and
storing the manual adjustment in a user profile.

16. The computer readable storage medium of claim 10, wherein the operation further comprises:
receiving a user adjustment that exceeds the specified threshold for the learned adjustment;
adjusting the display parameter based on the learned adjustment; and
storing the learned adjustment in a user profile.

17. The computer readable storage medium of claim 10, wherein the operation further comprises:
receiving overrides from one or more computing devices, wherein each override specifies an adjustment, and wherein the adjustment specifies a display parameter of the one or more display parameters and an adjustment value;
defining a community threshold for the overrides; and
upon determining that the overrides exceed the community threshold:
determining a community adjustment based on the overrides;
adjusting the display parameter based on the community adjustment; and
storing the community adjustment in a user profile.

18. A system, comprising:
a processor; and
a memory containing a program, which when executed by the processor is configured to perform an operation for presenting map data on a computing device, the operation comprising:
providing data describing a location and movement of the computing device;
determining a usage mode based on the data, wherein the usage mode is selected from a predefined plurality of usage modes each corresponding to a different type of user activity, and wherein each usage mode is associated with one or more display parameters;
rendering an image on the computing device according to the one or more display parameters associated with the selected usage mode, wherein the image includes map data and points of interest (POIs), and whereby the image is adaptively rendered according to the data describing the location and movement of the computing device; and
defining a learned override specifying a learned adjustment and a threshold for the learned adjustment, wherein the learned adjustment specifies a display parameter of the one or more display parameters and an adjustment value.

19. The system of claim 18, wherein the operation further comprises:
adjusting at least one of the one or more display parameters based on the data describing the location and movement of the computing device.

20. The system of claim 18, whereby the image is further adaptively rendered according to at least one physical characteristic of the computing device, the at least one physical characteristic including display resolution.

21. The system of claim 18, wherein the one or more display parameters include at least a zoom level and a POI setting, wherein the POI setting includes a number of POIs to display and a type of POI to display, and wherein the usage mode is selected from at least:
(i) a walking mode, if the computing device is moving at a speed and along a path indicative that a user of the computing device is walking;
(ii) a shopping mode, if the computing device is at a location corresponding to a shopping environment; and
(iii) a driving mode, if the computing device is moving at a speed and along a path indicative that the user is driving.

22. The system of claim 20, wherein the operation further comprises:
adjusting at least one of the one or more display parameters based on the at least one physical characteristic of the computing device.

23. The system of claim 18, wherein the operation further comprises:
receiving a manual override request specifying a manual adjustment, wherein the manual adjustment specifies a display parameter of the one or more display parameters and an adjustment value;
adjusting the display parameter based on the manual adjustment; and
storing the manual adjustment in a user profile.

24. The system of claim 18, wherein the operation further comprises:
receiving a user adjustment that exceeds the specified threshold for the learned adjustment;
adjusting the display parameter based on the learned adjustment; and
storing the learned adjustment in a user profile.

25. The system of claim 18, wherein the operation further comprises:
receiving overrides from one or more computing devices, wherein each override specifies an adjustment, and wherein the adjustment specifies a display parameter of the one or more display parameters and an adjustment value;
defining a community threshold for the overrides; and
upon determining that the overrides exceed the community threshold:
determining a community adjustment based on the overrides;
adjusting the display parameter based on the community adjustment; and
storing the community adjustment in a user profile.

* * * * *